United States Patent [19]

Berglund et al.

[11] Patent Number: 5,872,984
[45] Date of Patent: Feb. 16, 1999

[54] UNINTERRUPTIBLE POWER SUPPLY PROVIDING CONTINUOUS POWER MAINSTORE FUNCTION FOR A COMPUTER SYSTEM

[75] Inventors: Neil Clair Berglund, Kasson; Thomas David Roettger; Jan Douglas Smid, both of Rochester, all of Minn.

[73] Assignee: International Business Machines Corporation, Armonk, N.Y.

[21] Appl. No.: 831,345

[22] Filed: Apr. 1, 1997

[51] Int. Cl.[6] ........................................... G06F 1/26
[52] U.S. Cl. .................. 395/750.08; 395/750.03; 395/182.2; 307/66
[58] Field of Search ................ 395/750.01, 750.02, 395/750.03, 750.04, 750.05, 750.06, 750.07, 750.08, 182.2, 182.22; 307/22, 26, 29, 38, 41, 64, 66, 115; 363/34, 109

[56] References Cited

U.S. PATENT DOCUMENTS

| | | | |
|---|---|---|---|
| 4,143,283 | 3/1979 | Graf et al. | 307/66 |
| 4,959,774 | 9/1990 | Davis | 364/200 |
| 5,347,164 | 9/1994 | Yeh | 307/66 |
| 5,424,994 | 6/1995 | Nagasawa | 365/229 |
| 5,481,730 | 1/1996 | Brown et al. | 395/750.01 |
| 5,659,208 | 8/1997 | Kimble et al. | 307/82 |
| 5,691,630 | 11/1997 | Chosa | 307/39 |
| 5,751,564 | 5/1998 | Dien | 307/64 |
| 5,781,422 | 7/1998 | Lavin et al. | 307/64 |

FOREIGN PATENT DOCUMENTS 7248859 9/1995 Japan.

Primary Examiner—Meng-Ai T. An
Assistant Examiner—Xuan M. Thai
Attorney, Agent, or Firm—Joan Pennington; Matthew J. Bussan

[57] ABSTRACT

A method for providing back-up power for system mainstore memory and an uninterruptible power system (UPS) for a computer system are provided. The computer or data processing system includes a system memory and a system power supply. The uninterruptible power supply (UPS) includes an AC output and a DC output, an inverter circuit, a battery and an interface to the system power supply. The inverter circuit supplies AC power to the AC output. The battery supplies DC power to the DC output and to the inverter circuit. The interface enables the inverter circuit to initially supply AC power to the system power supply via the AC output upon detection of a utility power loss and then, after a predetermined period of time, activates the DC output to supply DC power to the system memory via the system power supply, and disables the inverter circuit to stop the initial supply of AC power to the system power supply.

10 Claims, 6 Drawing Sheets

| POSITION | DESCRIPTION |
|---|---|
| 1,2 | +48 VDC CPM |
| 3,5 | GND |
| 4 | N/C |
| 5 | -UPS BYPASS |
| 7 | -UPS BATTERY LOW |
| 8 | -UPS ON |
| 9 | -UPS UTILITY FAIL |
| 10,11 | +48 VDC CPM |
| 12,15 | GND |
| 13 | N/C |
| 14 | + BATTERY TEST |
| 16 | - DC ON |
| 17,19 | GND |
| 18 | + INVERTER ENABLED |
| 20,21 | GND |
| 22 | -STATUS BIT 1 |
| 23,25 | GND |
| 24 | -STATUS BIT 2 |
| 26 | -STATUS BIT 3 |

LOGICAL INTERACE OUTPUTS 400

- UPS BYPASS ACTIVE 402 — NO GROUND (INACTIVE) GROUNDED IN THE UPS 150 TO INDICATE A UPS IS PRESENT

- UPS ON 404

- BATTERY LOW 406 — A LOW LEVEL INDICATES THE BATTERY 162 MAY NOT CONTAIN SUFFICIENT ENERGY TO SUSTAIN A TWO MINUTE AC OUTAGE

- UTILITY FAILURE 408 — A LOW LEVEL INDICATES UTILITY POWER HAS BEEN LOST AND THE UPS 150 IS PROVIDING ENERGY FROM ITS BATTERIES 162

FIG.4B

LOGICAL INTERFACE -STATUS BIT 1-3 OUTPUTS 410

| STATE | DESCRIPTION |
|---|---|
| 000 | UPS NORMAL, INVERTER ENABLED |
| 001 | BATTERY TEST ACCEPTED |
| 010 | BATTERY TEST REJECTED |
| 011 | CPM DEFECTIVE |
| 100 | UPS BATTERY DEFECTIVE |
| 101 | UPS DEFECTIVE |
| 110 | OVERLOAD |
| 111 | UPS NORMAL, INVERTER DISABLED |

LOGICAL INTERFACE INPUTS 500

+INVERTER ENABLED 502 — A HIGH LEVEL ENABLES THE UPS TO PROVIDE AC TO THE USING SYSTEM AT THE NEXT LOSS OF UTILITY POWER. A LOW LEVEL CAUSES THE UPS TO DISABLE THE INVERTER SO THAT AC IS REMOVED OR CAN NOT BE PROVIDED TO THE USING SYSTEM FROM THE BATTERIES.

-DC ON 504 — A HIGH TO LOW TRANSITION ON THIS SIGNAL WHILE +INVERTER ENABLED IS ACTIVE, ACTIVATES THE DC OUTPUT (+48V) OF THE UPS.

+BATTERY TEST REQUEST 506 — A HIGH LEVEL REQUEST THE UPS TO PERFORM A BATTERY TEST.

FIG.5

UNINTERRUPTIBLE POWER SUPPLY PROVIDING CONTINUOUS POWER MAINSTORE FUNCTION FOR A COMPUTER SYSTEM

FIELD OF THE INVENTION

The present invention relates to the data processing field, and more particularly, relates to an improved method for providing back-up power for system mainstore memory in a computer system and an uninterruptible power system (UPS) for a computer system providing a continuous power mainstore function.

DESCRIPTION OF THE PRIOR ART

Stand alone uninterruptible power systems (UPSs) have been used for a back-up solution on many known computer systems, such as some models of the IBM AS/400. As memory capacities of many computer systems grow, typical UPS hold-up times (around 15 minutes) can no longer support the time required to write the contents of the mainstore memory to a nonvolatile media, such as disk storage, for a controlled shut-down of many systems. The standard stand alone AC-to-AC UPS presently does not provide an effective power back-up solution for many computer systems with a large mainstore memory.

A need exists for an improved method for providing back-up power for system mainstore memory and an uninterruptible power system (UPS) for a computer system providing a continuous power mainstore function.

SUMMARY OF THE INVENTION

Important objects of the present invention are to provide an improved method for providing back-up power for a system mainstore memory and an uninterruptible power system (UPS) for a computer system providing a continuous power mainstore function; to provide such improved method and uninterruptible power system (UPS) substantially without negative effects and that overcome many disadvantages of prior art arrangements.

In brief, a method for providing back-up power for a system mainstore memory and an uninterruptible power system (UPS) for a computer or data processing system are provided. The computer or data processing system includes a system mainstore memory and a system power supply. The uninterruptible power supply (UPS) includes an AC output and a DC output, an inverter circuit, a battery and an interface to the system power supply. The inverter circuit supplies AC power to the AC output. The battery supplies DC power to the DC output and to the inverter circuit. The interface enables the inverter circuit to initially supply AC power to the system power supply via the AC output upon detection of a utility power loss and then, after a predetermined period of time, activates the DC output to supply DC power to the system memory via the system power supply, and disables the inverter circuit to stop the initial supply of AC power to the system power supply.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 is a chart illustrating an exemplary connection definition for the uninterruptible power supply of the system of FIG. 1A and FIG. 1B;

FIG. 4A and 4B are charts illustrating an exemplary logical interface output definition for the uninterruptible power supply of the system of FIG. 1A and FIG. 1B; and FIG. 5 is a chart illustrating an exemplary logical interface input definition for the uninterruptible power supply of the system of FIG. 1A and FIG. 1B.

DETAILED DESCRIPTION OF THE PREFERRED EMBODIMENTS

Figure 1A:
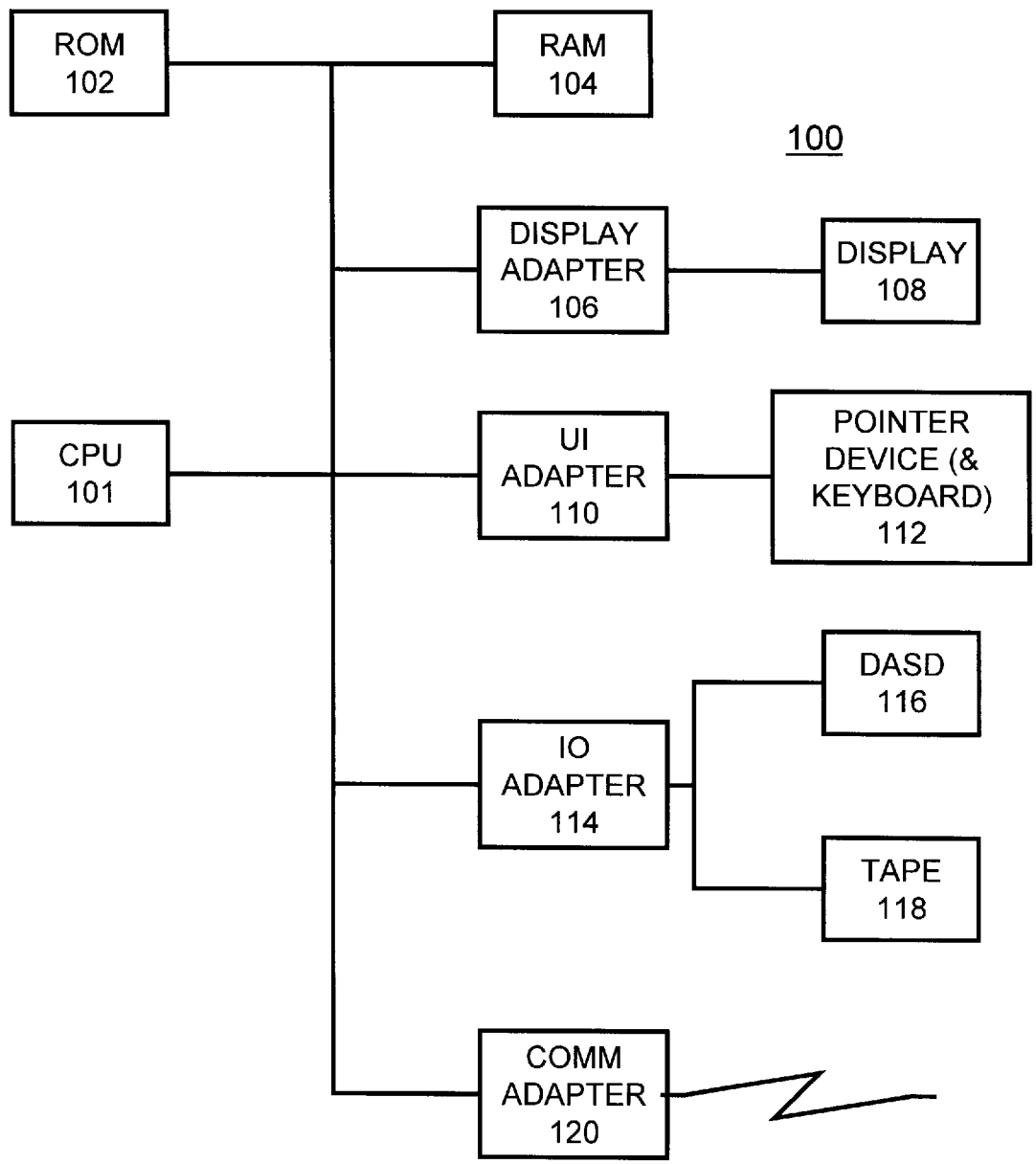
FIG. 1A and FIG. 1B are block diagram representations of a computer or data processing system of the preferred embodiment.
Figure 1B:
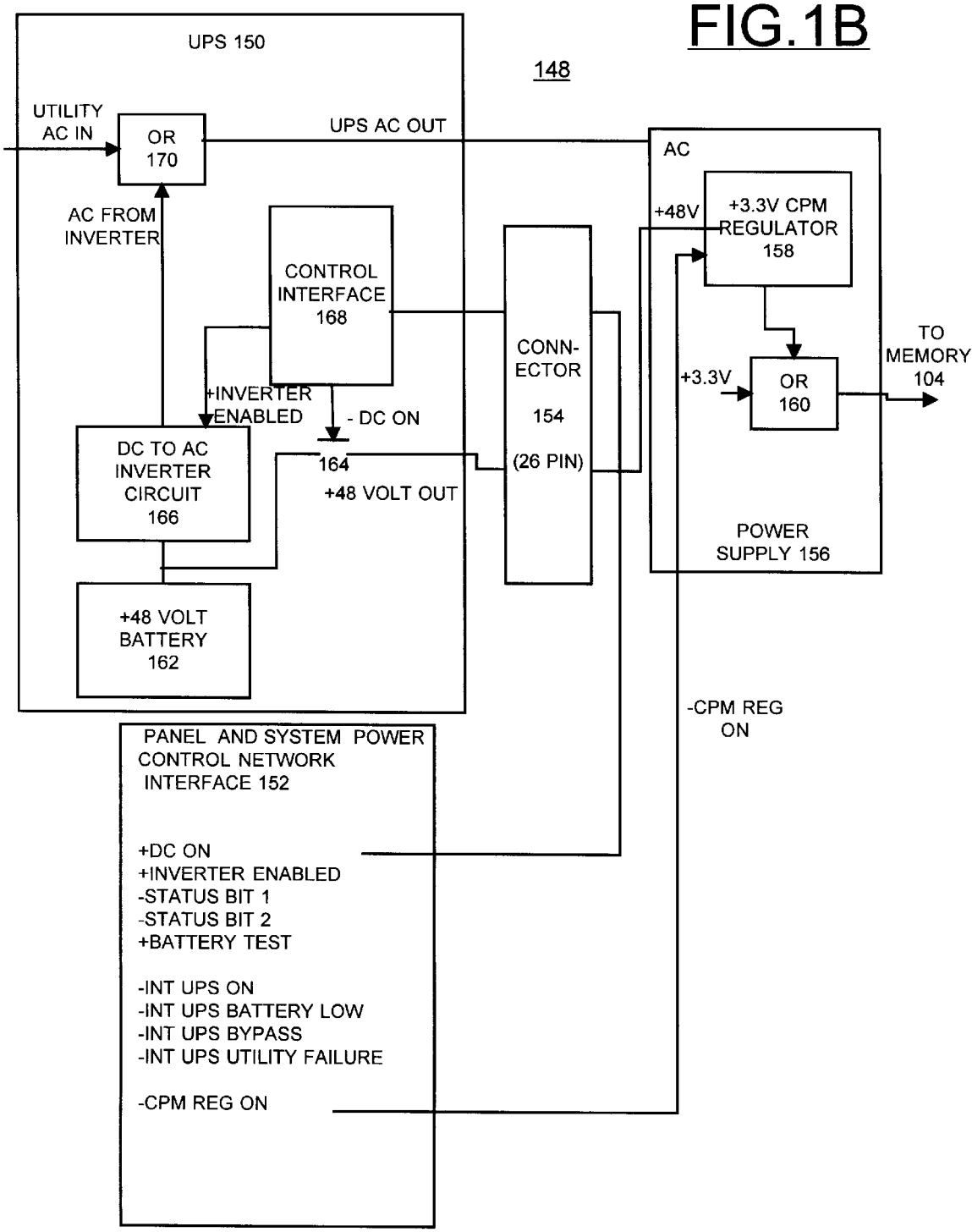

Having reference now to the drawings, in FIGS. 1A and 1B, there is shown a computer or data processing system of the preferred embodiment generally designated by the reference character 100. As shown in FIG. 1A, computer system 100 includes a central processor unit (CPU) 101, a read only memory 102, a random access memory or system mainstore memory 104, a display adapter 106 coupled to a display 108. CPU 101 is connected to a user interface (UI) adapter 110 connected to a pointer device and keyboard 112. CPU 101 is connected to an input/output (IO) adapter 114 connected to a direct access storage device (DASD) 116 and a tape unit 118. CPU 101 is connected to a communications adapter 120 providing a communications function.

As shown in FIG. 1B, computer system 100 includes a power system generally designated by the reference character 148. The power system 148 includes an uninterruptible power supply (UPS) 150 connected to a system power control network (SPCN) interface 152 via a predetermined interface connector 154, such as a multiple pin connector or a 26 pin D-shell connector, and to a system power supply 156 that includes a continuously powered memory or mainstore (CPM) direct current (DC) voltage regulator 158.

The DC battery voltage output is fed into the power supply 156 via the 26-pin UPS external connector 154. The CPM voltage regulator 158 selectively receives a predetermined DC battery voltage output from the UPS 150, such as a +48 V or 24 V output of a UPS battery 162. The CPM voltage regulator 158 provides a set DC voltage output, such as +3.3 Volt output. The +3.3 V output of CPM voltage regulator 158 is used to keep the system memory 104 alive during the time CPM is required. The +3.3 V output of CPM voltage regulator 158 is applied to a first input of an OR function 160 connected to the system memory 104. A second 3.3 Volt input to the OR gate 160 is provided by the system power supply 156 typically supplying power to the system memory 104. Otherwise, the CPM voltage regulator 158 provides power to the system memory 104 in accordance with a feature of the preferred embodiment.

The uninterruptible power supply (UPS) 150 includes one or more batteries 162 selectively providing the predetermined DC battery voltage output to the CPM voltage regulator 158 via a switch 164 within the UPS 150. A DC-to-AC inverter circuit 166 and the switch 164 are operatively controlled by a control interface block 168 of the UPS 150. During normal operation, a utility AC input to the UPS 150 is coupled by an OR function 170 to an AC input of the system power supply 156. Upon detection of a utility power loss, the uninterruptible power supply (UPS) 150 for the data processing system 100 initially supplies AC power to the power supply 156 in the system 100 and then, after a predetermined period of time, stops supplying AC power, and instead supplies DC power to the system memory 104 via CPM voltage regulator 158 of the system power supply 156. Preferably, the system power control network (SPCN) 152 determines when the predetermined period of time of utility power loss has passed and then sends an Inverter Disable Command and a DC On Command to the UPS 150.

In accordance with the preferred embodiment of the power system 148, the 26-pin connector 154 has been defined with predetermined pin assignments as illustrated and described with respect to FIG. 3, and a signal interface to the UPS 150 has been defined to provide the CPM function as illustrated and described with respect to FIGS. 4A, 4B, and 5. The power system 148 is designed so that once the CPM control state is established by the system 100, all power can be removed from the system control circuitry. This makes all power from the UPS battery 162 available to memory 104. In addition, the power system 148 is designed so that its connecting cable connector 154 cannot be interrupted as a condition to turn on the DC output of UPS 150 via switch 164.

The external interface connector 154 is arranged to allow the use of the CPM voltage regulator 158 of the preferred embodiment with an external stand-alone uninterruptible power supply UPS configured for use with this interface. Various commercially available systems can be used for computer system 100, for example, an IBM personal computer or similar workstation can be used when provided with the power system 148 of the preferred embodiment.

Figure 2:
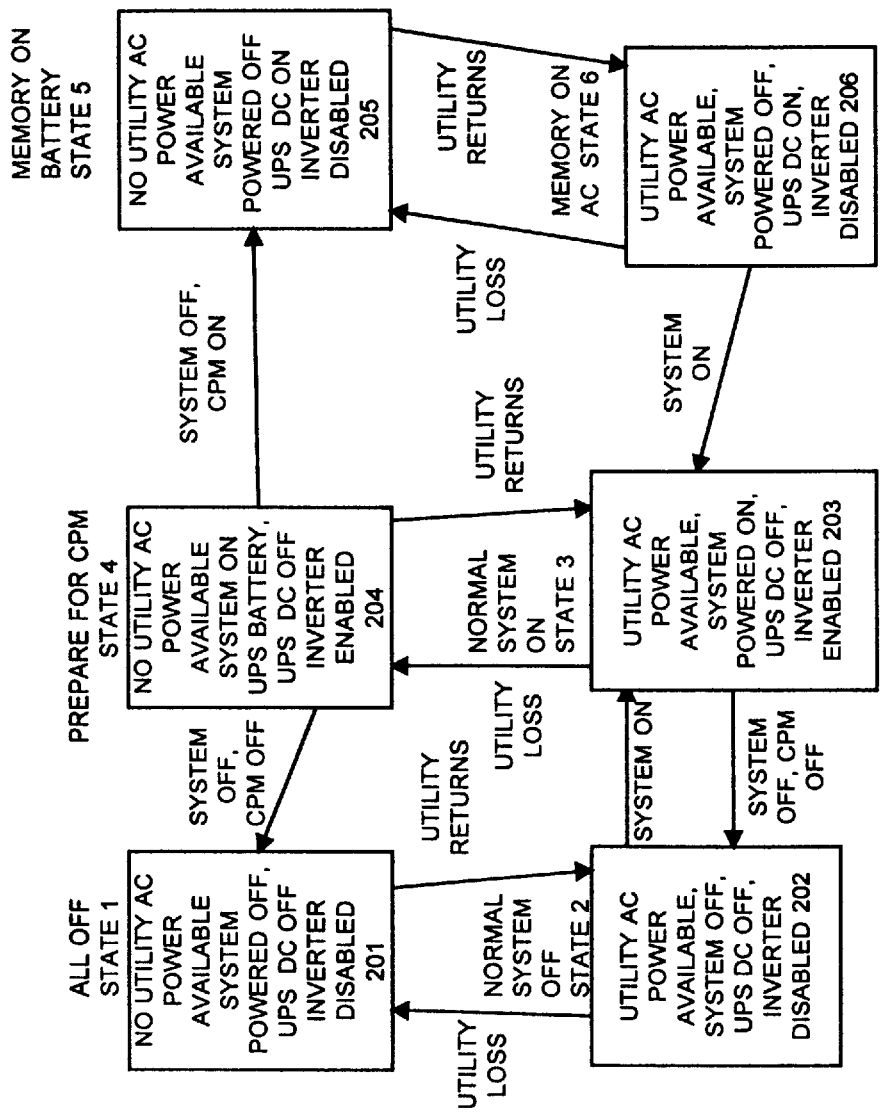
FIG. 2 is a functional block diagram illustrating state transitions of a power system including an uninterruptible power supply of the system of FIG. 1A and FIG. 1B.

Referring to FIG. 2, there is shown a functional block diagram illustrating state transitions of the uninterruptible power supply 150 and the system 100. As indicated at a block 201 in state 1, the system 100 and UPS 150 is completely unpowered and inverter 166 disabled, occurring at installation and any time utility power is removed after the system 100 is powered off. Restoration of utility power causes a transition to state 2 as indicated at a block 202.

In state 2 at block 202, the UPS 150 has applied AC power to the system 100 with the system 100 turned off and inverter 166 disabled. State 2 at block 202 is the normal powered off state of the system 100. If a utility power failure occurs at state 2 at block 202, the system 100 returns to state 1 at block 201 as shown at line UTILITY LOSS, the inverter 166 is not started, the DC output is not turned on, and the system 100 loses AC power. When the system is turned on in state 2 at block 202, a transition to state 3 as indicated at a block 203 is provided as shown at line SYSTEM ON.

State 3 at block 203 is the normal powered on state of the system 100 and the UPS 150 is on with the inverter AC and battery DC outputs of UPS 150 turned off with the inverter 166 enabled. When the system 100 is turned off in state 3, the transition to state 2 is provided as shown at line SYSTEM OFF DISABLED. When a utility power failure occurs at state 3 at block 203, which is signaled by a UPS utility failure signal, it causes a transition to state 4 as indicated at a block 204 shown at line UTILITY LOSS. In state 4, the system 100 is on and the UPS provides AC power to the system 100 with the inverter circuit 166 while the DC power from UPS 150 is off. If the utility power returns within a predetermined time period, for example within 30 seconds while in state 4 at block 204, the transition to state 3 is provided as shown at a line UTILITY RETURNS. If the utility power is not restored within the predetermined time period, the system 100 makes a transition to either state 1 at block 201 or a state 5 as indicated at a block 205. The system 100 makes a transition as shown at a line SYSTEM OFF DISABLED to the state 1 at block 201 when conditions require a power off disabled so that the DC output will not be started. Otherwise when conditions permit a power off enabled, the system 100 makes a transition as shown at a line SYSTEM OFF ENABLED to the state 5 at block 205 where the UPS DC power is turned on and applied to the CPM regulator 158 of the power supply 156.

In state 5 at block 205, the inverter circuit 166 is off so that no AC power is provided to the system 100 and the interface signals are controlled by pull down resistors as in state 1 at block 201. The UPS 150 shuts down its logic to maximize the energy available to the system 100 with the DC output providing power to maintain the contents of the system memory 104. Restoration of utility power in state 5 at block 205 causes a transition to state 6 as indicated at a block 206 shown at line UTILITY RETURNS. In state 6 at block 206, the UPS 150 powers on and applies AC power to the system 100. Since the system 100 may remain off indefinitely, state 6 may exist indefinitely. The DC output of UPS 150 is maintained active to keep the system memory 104 powered. In state 6, UPS 150 maintains the DC output by utilizing the restored utility power for charging the battery 162. No transition state exists between state 5 and state 6 because the system power control network interface 152 determines that CPM is enabled in state 6 and the DC on interface signal is maintained in its default active state so that the UPS 150 does not turn off the DC output to CPM regulator 158. If a utility power failure occurs in state 6 at block 206, system 100 makes a transition as shown at a line UTILITY LOSS to the state 5 at block 205.

The normal transition from state 6 to state 3 at block 203 results from a system power on operation as shown at a line SYSTEM ON. After the system 100 has successfully powered on and enabled the inverter circuit 166, the DC output is turned off and the memory 104 is powered by the normal operation of system power supply 156.

Referring to FIG. 3, connections for the 26-pin UPS external connector 154 are defined as follows in Table 1 below:

TABLE 1

| Position | Description |
| --- | --- |
| 1, 2 | +48 VDC CPM |
| 3, 5 | Gnd |
| 4 | N/C |
| 5 | −UPS Bypass |
| 7 | −UPS Battery Low |
| 8 | −UPS On |
| 9 | −UPS Utility Fail |
| 10, 11 | +48 VDC CPM |
| 12, 15 | Gnd |
| 13 | N/C |
| 14 | +Battery Test |
| 16 | −DC On |
| 17, 19 | Gnd |
| 18 | +Inverter enabled |
| 20, 21 | Gnd |
| 22 | −Status Bit 1 |
| 23, 25 | Gnd |
| 24 | −Status Bit 2 |
| 26 | −Status Bit 3 |

Referring to FIG. 4A, exemplary logical interface outputs 400 are shown as follows in Table 2:

TABLE 2

| | |
|---|---|
| −UPS Bypass Active 402 | no connect or inactive |
| −UPS On 404 | grounded in the UPS 150 to indicate a UPS is present |
| −Battery Low 406 | a low level indicating the battery 162 may not contain sufficient energy to sustain a two minute AC outage |
| −Utility Failure 408 | a low level indicates utility power has been lost and the UPS 150 is providing energy from its batteries 162 via the inverter circuit 166. |

Referring to FIG. 4A, exemplary logical interface status bit (1–3) outputs 410 providing encoded status to the system 100 are shown as follows in Table 3:

TABLE 3

| State | Description |
|---|---|
| 000 | UPS Normal, Inverter Enabled |
| 001 | Battery Test Accepted |
| 010 | Battery Test Rejected |
| 011 | CPM defective |
| 100 | UPS Battery Defective |
| 101 | UPs Defective |
| 110 | Overload |
| 111 | UPS Normal, Inverter Disabled |

Referring to FIG. 500, exemplary logical interface status inputs 500 are shown as follows in table 4:

TABLE 4

| | |
|---|---|
| +Inverter Enabled | A high level enables the UPS to provide AC to the using system at the next loss of utility power. A low level causes the UPS to disable the inverter so that AC is removed or can not be provided to the using system from the batteries. |
| −DC On | A high to low transition on this signal while +Inverter Enabled is active, activates the DC output (+48 v) of the UPS. |
| +Battery Test Request | A high level reguest to the UPS to perform a battery test. |

While the present invention has been described with reference to the details of the embodiments of the invention shown in the drawing, these details are not intended to limit the scope of the invention as claimed in the appended claims.

What is claimed is:

1. An uninterruptible power supply (UPS) for a data processing system having a system memory and a system power supply, comprising:
   an AC output;
   a DC output;
   an inverter circuit for supplying AC power to said AC output;
   a battery for supplying DC power to said DC output and to said inverter circuit; and
   an interface that enables said inverter circuit to initially supply AC power to the system power supply via said AC output upon detection of a utility power loss and then, after a predetermined period of time, activates said DC output to supply DC power to the system memory via the system power supply, and disables said inverter circuit to stop the initial supply of AC power to the system power supply.

2. An uninterruptible power supply (UPS) for a data processing system as recited in claim 1 wherein said predetermined period of time is provided in a range between a set number of seconds to a number of minutes.

3. An uninterruptible power supply (UPS) for a data processing system as recited in claim 1 wherein said interface includes a multiple pin connector connecting the UPS to the system power supply.

4. An uninterruptible power supply (UPS) for a data processing system as recited in claim 1 further includes a control function and wherein said interface applies predefined status signals to said control function.

5. An uninterruptible power supply (UPS) for a data processing system as recited in claim 1 wherein the system power supply includes a voltage regulator, said voltage regulator receiving said DC power from said battery and providing a predetermined DC voltage to the system memory.

6. A method for providing back-up power for a mainstore memory in a computer system including a power supply and the mainstore memory, said method comprising the steps of:
   providing an uninterruptible power supply (UPS) including an inverter circuit for supplying AC power to an AC outlet and a battery for supplying DC power to a DC outlet and said inverter circuit;
   enabling the inverter circuit to initially supply AC power to the system power supply via said AC output upon detection of a utility power loss;
   identifying a predetermined period of time, and activating said DC output to supply DC power to the system mainstore memory via the system power supply; and
   disabling the inverter circuit to stop the initial supply of AC power to the system power supply.

7. A method for providing back-up power for system mainstore memory in a computer system as recited in claim 6 wherein the step of identifying a predetermined period of time includes the step of identifying a set period of time provided in a range between a predefined number of seconds to a predefined number of minutes.

8. A method for providing back-up power for system mainstore memory in a computer system as recited in claim 6 includes the step of providing a multiple pin connector for connecting said AC outlet and said DC outlet of said UPS to the system power supply.

9. A method for providing back-up power for system mainstore memory in a computer system as recited in claim 6 wherein the step of activating said DC output to supply DC power to the system memory via the system power supply includes the steps of providing a voltage regulator in the system power supply, said voltage regulator receiving said DC power from said battery and providing a predetermined DC voltage to the system memory.

10. A data processing system comprising:
   a system memory;
   a system power supply including a voltage regulator;
   an uninterruptible power supply (UPS), said UPS including;
   an AC output;
   a DC output;
   an inverter circuit for supplying AC power to said AC output;

a battery for supplying DC power to said DC output and to said inverter circuit; and an interface that enables said inverter circuit to initially supply AC power to said system power supply via said AC output upon detection of a utility power loss and then, after a predetermined period of time, activates said DC output to supply DC power to said system memory via said voltage regulator, and disables said inverter circuit to stop the initial supply of AC power to said system power supply.

* * * * *